No. 12,171. REISSUED NOV. 17, 1903.

G. W. McGILL.

SPRING CLIP.

APPLICATION FILED SEPT. 23, 1903.

2 SHEETS—SHEET 1.

Witnesses:

W. Harry McGill.

G. Perry

Inventor:

George W. McGill

No. 12,171.

REISSUED NOV. 17, 1903.

G. W. McGILL.

SPRING CLIP.

APPLICATION FILED SEPT. 23, 1903.

2 SHEETS—SHEET 2.

Witnesses:

W. Harry McGill.

G. Harry

Inventor:

George W. McGill

No. 12,171. Reissued November 17, 1903.

UNITED STATES PATENT OFFICE.

GEORGE W. McGILL, OF RIVERDALE-ON-HUDSON, NEW YORK.

SPRING-CLIP.

SPECIFICATION forming part of Reissued Letters Patent No. 12,171, dated November 17, 1903.

Original No. 731,598, dated June 23, 1903. Application for reissue filed September 23, 1903. Serial No. 174,373.

*To all whom it may concern:*

Be it known that I, GEORGE W. McGILL, a citizen of the United States, and a resident of Riverdale-on-Hudson, in the county of New York and State of New York, have invented certain new and useful Improvements in Spring-Clips, of which the following is a specification.

My invention has for its object to provide a spring-clip adapted to hold papers, prints, and similar articles and also to suspend the same from a nail, rod, or like article; and it consists of a single piece of suitable spring-wire having its end parts folded upon each other in manner to provide the clip a frame or body part, in the greater part of which the wire is in two strands superimposed in spring-bearing one upon the other, and having a part of the wire in each of such strands and forming the lower part or base of the frame bent and such bends set side by side in position therein to jointly provide between them a space opening outwardly from the frame and forming a mouth thereto adapted to receive the edges of the articles being clipped and to admit of the bearing of the opposite outer surfaces of such articles against the opposite under surfaces of the respective bends in the wire forming such mouth in manner to assist in spreading apart the superimposed surfaces of the wires in the frame on each side of such mouth upon the articles being pressed into said mouth or by pressing the clip down upon the edges of the articles so placed.

Figure 1:
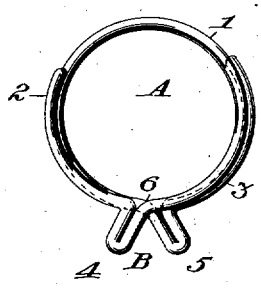
Figure 2:
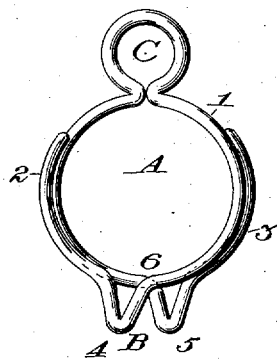
Figure 3:
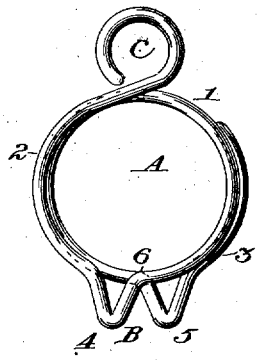
Figure 4:
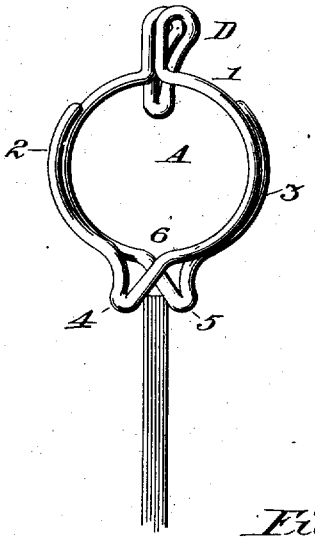
Figure 5:
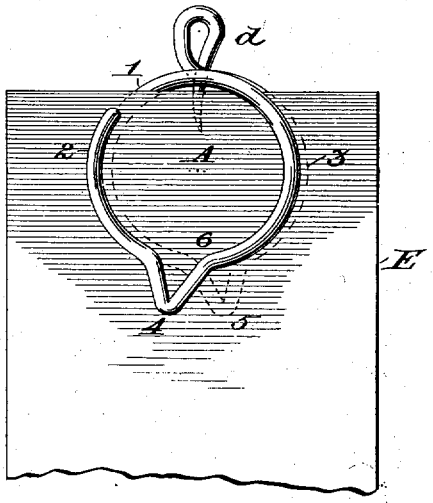
Figure 6:
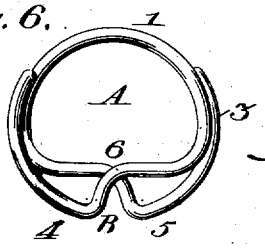
Figure 7:
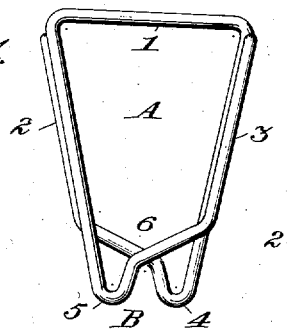
Figure 10:
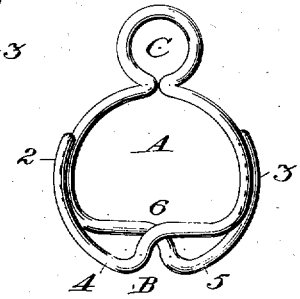
Figure 8:
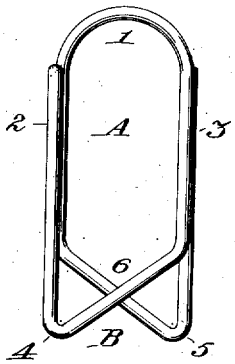
Figure 9:
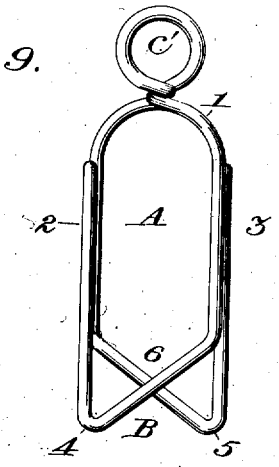

In the accompanying drawings, forming part of this specification, and in which similar reference letters and numerals indicate corresponding parts, Figures 1 to 6, inclusive, show the clip having a frame or body part of helical ring formation, Fig. 7 having a frame of angular configuration, and Figs. 8 and 9 with frames of quadrilateral configuration. Fig. 1 is a side elevation of the clip minus its suspending feature. Fig. 2 is a similar side elevation of the device, showing a modified arrangement of the bends forming its mouth and including its suspending part, which is shown therein having a ring formation. Fig. 3 is a view similar to Fig. 2, showing a modification in the construction of the suspending part of the clip. Fig. 4 is a similar view showing the suspending feature of the device having a hooked formation and with the mouth of the device resting crosswise upon the edge of several sheets of paper preliminary to the latter being inserted between its superimposed folds. Fig. 5 is a similar view of the clip, showing a further modification in the construction of its suspending part and showing clasped between the entire bearing-surfaces of the superimposed folds the papers first entered in its mouth, as shown in Fig. 4, and moved up therefrom to the position shown in said Fig. 5. Fig. 6 represents a side elevation of the clip, showing a modified configuration of the bends or folds of the wires, producing the mouth of the clip. Fig. 7 is a similar view of the clip, in which its frame is shown of angular formation with the top part thereof forming the base of the angle; and Figs. 8 and 9 are similar views showing the clip-frame of each having a quadrilateral formation with its top part arched, and in Fig. 9 with the arched top supplemented with a ring, integral therewith, for suspending the clip on a nail, &c. Fig. 10 is a view similar to Fig. 6 and in addition having the upper part of the clip-frame provided with means for suspending the device similar in formation to that shown in Fig. 2.

In the figures of the drawings, A represents the frame or body part of the clip. B represents its outwardly-open mouth. C *c* represent its ring-shaped suspending part, and D *d* the same part hook-shaped.

In the body part or frame A of the device the wire is doubled except at the top of the frame, whereat it is left single, as at 1, and below which may terminate one or both of the free ends of the wire. The wire so doubled forms the two superimposed strands of the frame, (marked, respectively, 2 and 3 in the drawings,) said strands being in spring contact or bearing with each other throughout their superimposed parts. At the lower part or base of the frame the wire of these strands, respectively, is bent or folded in lip formation, as at 4 5, and in manner to intersect with each other, as at 6, and jointly provide between them the outwardly-open space or mouth B.

In Fig. 2 a part of the single wire 1, forming the top of the frame A, is shown looped outward from the circumference of such frame in manner to provide the suspending-ring part C, with which to suspend from a nail the device and the articles clipped therewith.

In Fig. 3 instead of part of the single wire 1 in the frame being looped into the suspending-ring D, as in Fig. 2, the free end of the strand 2 of the wire is continued up to and above the top of the frame and there looped around upon itself to form the suspension-ring *c*, and in Fig. 4 a part of this single wire 1 is projected outward and upward from the frame in doubled formation and folded over upon itself in manner to provide the device an outwardly-projecting two-stranded suspending-hook D, adapted to be hooked over a cord or rod in suspending the device therefrom. In this figure the device is shown resting on the combined edges of several sheets of paper E preliminary to the latter being finally entered between its superimposed strands, as is shown in Fig. 5, in which latter figure the suspending feature of the clip is shown provided by the end part of the strand 3 of the wire being continued up to and above the top of the frame and there folded back upon itself in manner to provide the single-strand pin-pointed suspending-hook *d*, adapted to be hooked over a cord or rod or to have its pin-pointed terminal inserted in some fabric in its suspension therefrom.

In Fig. 6 the mouth B of the clip is shown provided by bending or folding part of the respective wires in the lower part of its frame inward and laterally in opposite directions instead of outward, as is shown in the other figures of the drawings.

In Fig. 7 the clip-frame is shown of angular formation, or wider at its top than at its base, this formation admitting of its receiving and clamping between its superimposed strands a greater bulk of material than it could were its top part of the same spread or width as is its base. In Figs. 8 and 9 the clip-frame is shown of quadrilateral formation.

In Fig. 10 the mouth B of the clip is shown receding within the lower side of the frame or reëntrant therein, as in Fig. 6, and the opposite side of the frame provided with means for suspending it, consisting of an integral loop, such as is shown in Fig. 2.

The device may be provided with a body part or frame of other varying configurations without avoiding my improvement, the salient feature of which consists in providing part of the wire in each of the strands forming the clip-frame with folds set side by side in position therein to jointly provide between them a space opening outwardly from one side of the frame in manner to form a mouth thereto and adapted to receive therein the edges of the articles being clipped, the strands of the frame on each side of such folds being continued in superimposed spring-bearing into the opposite side of the frame.

The clip is applied to the purposes intended by entering crosswise in its mouth B the edges of the papers or other articles to be clamped, as is shown in Fig. 4, whereupon a slight pressure applied to the top of the clip will turn it upon the edges of such papers and bring it to a position corresponding with the plane occupied by the papers, with the opposite surfaces of the latter bearing against the inner surfaces of the respective bends or folds of the wire forming such mouth and separating them and the superimposed coils of the frame, and upon such pressure being continued the papers will be forced up between the superimposed wires in the ring-frame until the inner top of the latter rests upon and rides the edges of the clipped part of such papers.

What I claim as my invention, and desire to secure by Letters Patent, is—

1. A spring-clip constructed from a single wire having a body part or frame composed of two strands of the wire superimposed one upon the other in parallel spring-bearing throughout the greater part of the body of the frame, with both wires in one side of the frame folded in manner to jointly provide it a reëntrant mouth, and continued from each side of such mouth toward the opposite side of the frame in continuous superimposed spring-bearing on each other.

2. A spring-clip consisting of a single wire folded upon itself in manner to provide a body part or frame composed of two strands of the wire superimposed one upon the other in parallel spring-bearing throughout the greater part of the body of the frame, and having on one side of the frame a section of each strand folded in manner to provide the frame with two adjacent lips separated by an intervening space opening outwardly providing the frame a mouth and having the wire strands on each side of such folds continued in superimposed spring-bearing into the opposite side of such frame.

3. A spring-clip composed of a single wire having its end parts folded upon each other in manner to provide a body part or frame consisting of two strands of the wire superimposed in spring-bearing one upon the other throughout the greater part of the body of the frame and having part of each of such superimposed strands on one side of the frame provided with folds set adjacent to each other in manner to jointly provide between them a space or mouth opening outwardly, and adapted to receive therein the edges of articles being clipped preliminary to their final entrance between the superimposed surfaces of the sides of the frame.

4. A spring-clip consisting of a single wire folded upon itself in manner to provide a body part or frame composed of two strands of the wire superimposed one upon the other in parallel spring-bearing throughout the greater part of the body of the frame, and having a section of each strand folded in manner to provide the frame on one of its sides with two adjacent lips separated by an intervening space opening outwardly, providing the frame a mouth, and having the strands on each side of such folds extending in continuous superimposed spring-bearing toward the opposite side of such frame, with part of the wire in such opposite side folded outwardly therefrom in manner to provide means for suspending the clip.

5. A spring-clip composed of a single wire having its end parts coiled laterally upon each other in manner to provide the clip a helical ring-shaped frame, with part of each strand of the wire in such frame provided with folds or bends set in position, one bend adjacent to the other, to jointly provide between them a space or mouth opening outwardly from the frame, and with the coiled parts of the wires in the frame superimposed in spring-bearing, one upon the other, on each side of such space or mouth.

6. A spring-clip composed of a single wire having its end parts coiled laterally upon each other in manner to provide the device a helical ring-shaped frame or body part with part of the wires forming such frame superimposed in spring-bearing one upon the other, and having a section of each of them in the lower part of the frame bent and set in position therein, one bend adjacent to the other, to jointly provide between them a mouth opening outwardly from the frame, and having part of the wire in the opposite side of the frame folded outwardly therefrom in manner to provide the clip with means for suspending it.

Signed at Riverdale, in the county of New York and State of New York, this 15th day of August, A. D. 1902.

GEORGE W. McGILL.

Witnesses:
W. HARRY McGILL,
MARY L. H. McGILL.